(12) United States Patent
Kilgard

(10) Patent No.: US 8,432,410 B1
(45) Date of Patent: Apr. 30, 2013

(54) 3D GRAPHICS API EXTENSION FOR A SHARED EXPONENT IMAGE FORMAT

(75) Inventor: Mark J. Kilgard, Austin, TX (US)

(73) Assignee: Nvidia Corporation, Santa Clara, CA (US)

(*) Notice: Subject to any disclaimer, the term of this patent is extended or adjusted under 35 U.S.C. 154(b) by 1149 days.

(21) Appl. No.: 11/559,545

(22) Filed: Nov. 14, 2006

Related U.S. Application Data

(60) Provisional application No. 60/833,978, filed on Jul. 28, 2006.

(51) Int. Cl.
*G09G 5/00* (2006.01)
*G06T 15/00* (2006.01)
*G06F 13/14* (2006.01)

(52) U.S. Cl.
USPC .................. 345/581; 345/419; 345/520

(58) Field of Classification Search .......... 345/419, 345/520, 581
See application file for complete search history.

(56) References Cited

U.S. PATENT DOCUMENTS

| | | | |
|---|---|---|---|
| 5,005,137 A | 4/1991 | Ernst | |
| 5,392,393 A | 2/1995 | Deering | |
| 5,632,005 A * | 5/1997 | Davis et al. | 704/504 |
| 5,666,537 A | 9/1997 | Debnath et al. | |
| 5,812,854 A | 9/1998 | Steinmetz et al. | |
| 5,819,017 A | 10/1998 | Akeley et al. | |
| 5,870,097 A | 2/1999 | Snyder et al. | |
| 5,884,057 A | 3/1999 | Blomgren et al. | |
| 5,977,977 A | 11/1999 | Kajiya et al. | |
| 5,995,122 A | 11/1999 | Hsieh et al. | |
| 6,028,893 A * | 2/2000 | Schreib | 375/225 |
| 6,044,225 A | 3/2000 | Spencer et al. | |
| 6,247,116 B1 | 6/2001 | Abdallah et al. | |
| 6,650,327 B1 | 11/2003 | Airey et al. | |
| 6,751,725 B2 | 6/2004 | Bistry et al. | |
| 6,891,544 B2 | 5/2005 | Oka et al. | |
| 6,982,718 B2 | 1/2006 | Kilgard et al. | |
| 6,983,456 B2 | 1/2006 | Poznanovic et al. | |
| 7,006,101 B1 | 2/2006 | Brown et al. | |
| 7,009,615 B1 | 3/2006 | Kilgard et al. | |
| 7,015,915 B1 | 3/2006 | Diard | |
| 2002/0032852 A1 | 3/2002 | Ramirez et al. | |
| 2002/0090141 A1 | 7/2002 | Kenyon et al. | |
| 2002/0176009 A1 | 11/2002 | Johnson et al. | |
| 2003/0014454 A1 | 1/2003 | Steele, Jr. et al. | |
| 2003/0020741 A1 | 1/2003 | Boland et al. | |

(Continued)

OTHER PUBLICATIONS

Cornell University Program of Computer Graphics, "RGBE Image Format Specifications", http://www.graphics.cornell.edu/online/formats/rgbe/, Apr. 29, 1998.*
Pyopengl, "glDrawPixel", http://pyopengl.sourceforge.net/documentation/manual/glDrawPixels.3G.html, Oct. 19, 2002.*
Walter, "rgbe.c", May 26, 1995.*
Office Action. U.S. Appl. No. 11/565,566 dated Jun. 9, 2009.
EXT_packed_pixels, http://oss.sgi.com/projects/ogl-sample/registry/EXT/packed_pixels.txt, pp. 1-9.
ARB_texture_float, http://oss.sgi.com/projects/ogl-sample/registry/ARB/texture_float.txt, pp. 1-7.

*Primary Examiner* — Jeffrey Chow
(74) *Attorney, Agent, or Firm* — Patterson & Sheridan, LLP

(57) ABSTRACT

A three dimensional (3D) graphics application programming interface (API) extension provides support for specifying images in a shared exponent format. The shared exponent format is used to represent high dynamic range textures in a compact encoding to reduce the memory footprint needed to store the image data compared with other high dynamic range formats. Image data is encoded to and decoded from the shared exponent format using a pixel processing pipeline. Image data encoded into the shared exponent format can be decoded and used as texture data during rendering.

20 Claims, 12 Drawing Sheets

U.S. PATENT DOCUMENTS

| | | |
|---|---|---|
| 2003/0033588 A1 | 2/2003 | Alexander |
| 2003/0126176 A1 | 7/2003 | Devir |
| 2003/0164832 A1* | 9/2003 | Alcorn .................. 345/505 |
| 2004/0012596 A1 | 1/2004 | Allen et al. |
| 2004/0158693 A1 | 8/2004 | Dagan et al. |
| 2004/0169671 A1 | 9/2004 | Aronson et al. |
| 2005/0243094 A1 | 11/2005 | Patel et al. |
| 2006/0061584 A1 | 3/2006 | Kristiansen |
| 2006/0062233 A1 | 3/2006 | Brewer et al. |
| 2006/0104510 A1 | 5/2006 | Aharon et al. |
| 2006/0114260 A1 | 6/2006 | Diard |
| 2007/0258641 A1* | 11/2007 | Srinivasan et al. ............ 382/166 |
| 2008/0133246 A1* | 6/2008 | Fellers et al. ................. 704/500 |

OTHER PUBLICATIONS

Office Action. U.S. Appl. No. 11/565,993 dated Sep. 28, 2009.
Office Action, U.S. Appl. No. 11/565,993, dated Sep. 1, 2011.
Office Action, U.S. Appl. No. 11/548,241 dtd. Jul. 23, 2010.
Office Action, U.S. Appl. No. 11/548,247 dtd. Jul. 23, 2010.

* cited by examiner

PRIOR ART

3D GRAPHICS API EXTENSION FOR A SHARED EXPONENT IMAGE FORMAT

CROSS-REFERENCE TO RELATED APPLICATIONS

This application claims benefit of United States provisional patent application titled, "API Extensions for Advanced Graphics Processing Units," filed Jul. 28, 2006, and having Ser. No. 60/833,978, which is herein incorporated by reference.

BACKGROUND OF THE INVENTION

1. Field of the Invention

One embodiment of the present invention relate generally to a three dimensional (3D) graphics application programming interface (API) extension, and more particularly to converting image data to and from a shared exponent format.

2. Description of the Related Art

Recently 3D graphics content developers are using high dynamic range color components to increase visual realism. An 8 bit per component fixed point format does not provide enough range and precision to represent the high dynamic range color components. A floating point format, typically 16 or 32 bits per component provides the needed range and precision, but does not have a compact encoding compared with the fixed point format.

As the foregoing illustrates, what is needed in the art is the ability to represent high dynamic range values using a floating point format with a compact encoding in order to store images in the same or less memory than fixed point format images. Furthermore, it is desirable to specify the high dynamic range format with the compact encoding for use with graphics library operations that are provided by conventional APIs.

SUMMARY OF THE INVENTION

Systems and methods of the present invention provide a 3D graphics API extension for specifying images in a shared exponent format to encode high dynamic range values. The shared exponent format is used to represent high dynamic range textures in a compact encoding to reduce the memory footprint needed to store the image data compared with other high dynamic range formats. Image data is encoded to and decoded from the shared exponent format using a pixel processing pipeline. Image data encoded into the shared exponent format can be decoded and used as texture data during rendering. By using the 3D graphics API extension to specify a source or destination image format, image data may be encoded to and decoded from the shared exponent format without requiring a graphics application to perform the encoding or decoding. In particular, the shared exponent format may be specified for images that are processed using graphics library operations provided by the OpenGL architecture.

Various embodiments of a method of the invention for providing image data represented in shared exponent format for graphics processing include receiving source image data specified by an application program and a parameter that specifies the shared exponent format, processing the source image data using a pixel processing pipeline provided by function calls of a 3D graphics library to produce processed source image data, encoding the processed source image data into the shared exponent format to produce the image data represented in the shared exponent format, and transmitting the image data represented in the shared exponent format to a graphics memory for storage.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A 3D graphics API extension provides support for specifying images in a shared exponent format. The shared exponent format is used to represent high dynamic range textures in a compact encoding. Consequently, the memory footprint needed to store the image data is reduced compared with other high dynamic range formats. Image data is encoded to and decoded from the shared exponent format using the pixel processing pipeline. Image data encoded into the shared exponent format can be decoded and used as texture data during rendering. Importantly, using the 3D graphics API extension to specify a source (external or internal) or destination (internal or external) image format, image data may be encoded to and decoded from the shared exponent format without requiring a graphics application to perform the encoding or decoding. The shared exponent format may be specified as a format parameter for the destination image data. The shared exponent format may also be specified as a format parameter for the source image data to allow the application to provide the source image data pre-encoded in the shared exponent format. Furthermore, the 3D graphics API extension enables the shared exponent format to be specified or returned for existing OpenGL function calls, such as glDrawPixels, glReadPixels, glTexlmagel D, glTexlmage2D, glGetTexlmage, glTexlmage3D, glTexSublmagel D, glTexSublmage2D, glTexSublmage3D, glCopyTexlmagel D, glCopyTexlmage2D, glRenderbufferStorageEXT, glGetHistogram, glGetMinmax, glConvolutionFilterl D, glConvolutionFilter2D, glConvolutionFilter3D, glGetConvolutionFilter, glSeparableFilter2D, glGetSeparableFilter, glColorTable, glColorSubTable, glGetColorTable, glGetTexLevelParameterfv, and glGetTexLevelParameteriv.

Figure 1:
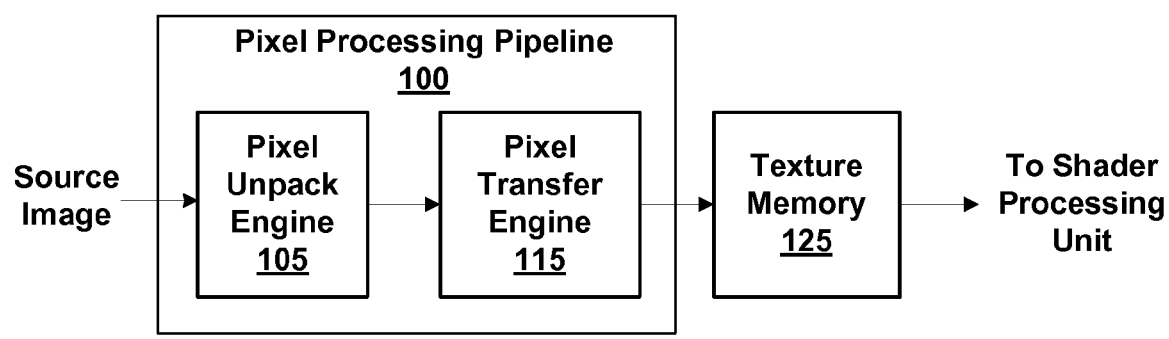
FIG. 1 is a block diagram illustrating a pixel processing pipeline in a prior art system.

FIG. 1 is a block diagram illustrating a prior art system including a pixel processing pipeline 100 defined by the current OpenGL architecture. Pixel processing pipeline 100 is used for specifying texture images, drawing pixels, copying pixels, and reading pixels. A source image for use as a texture map is received by a pixel unpack engine 105. Pixel unpack engine is configured using functions provided by the OpenGL graphics library to unpack the source image data words and produce an array of pixels including data representing one or more components for each pixel. Conventionally, the data may be represented in either a fixed-point format or a floating point format where each mantissa corresponds to a unique exponent. A pixel transfer engine 115 is configured using functions provided by the OpenGL graphics library to perform scale, bias, convolution, color conversion operations on the data. The pixel data output by pixel transfer engine 115 as texture data is stored in a texture memory 125 and is read by a shader processing unit as needed to perform shading operations. Texture memory 125 is conventionally embodied by a storage resource such as dynamic random access memory (DRAM) devices. Pixel unpack engine 105 and pixel transfer engine 115 may each be embodied as software programs or as hardware configured to perform the OpenGL function calls.

The present invention provides an API extension to OpenGL that allows data representing pixel or texture components to be specified, encoded to, and decoded from a packed format with an exponent that is shared between multiple texture or pixel components. The packed format is compact compared with storing an exponent for each component. Therefore, the amount of memory need to storage the data in a texture memory or frame buffer memory is reduced. Notably, when using the present invention, three floating point precision components may be represented in 32 bits compared with 36 bits or 96 bits for 16 or 32 bit per component floating point precision without a shared exponent.

Figure 2A:
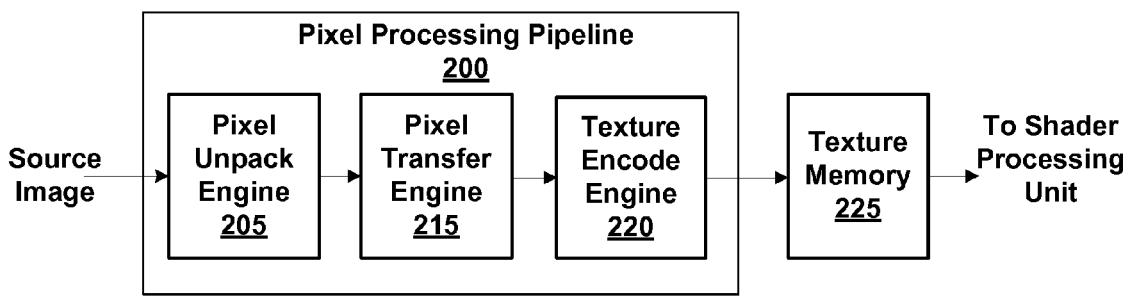
FIG. 2A is a block diagram illustrating a pixel processing pipeline including an encoding engine in accordance with one embodiment of the present invention.

FIG. 2A is a block diagram illustrating a pixel processing pipeline 200 including a texture encode engine 220, in accordance with one embodiment of the present invention. A pixel unpack engine 205 and a pixel transfer engine 215 perform the functions of previously described pixel unpack engine 105 and pixel transfer engine 115, respectively. Texture encode engine 220 is provided by the 3D graphics API extension and is used to encode and pack component values that represent texture map components into the shared exponent format. In the preferred embodiment of the present invention, the 3D graphics API extension is an extension of the OpenGL API that is accepted as a format parameter for existing OpenGL function calls.

Figure 2B:
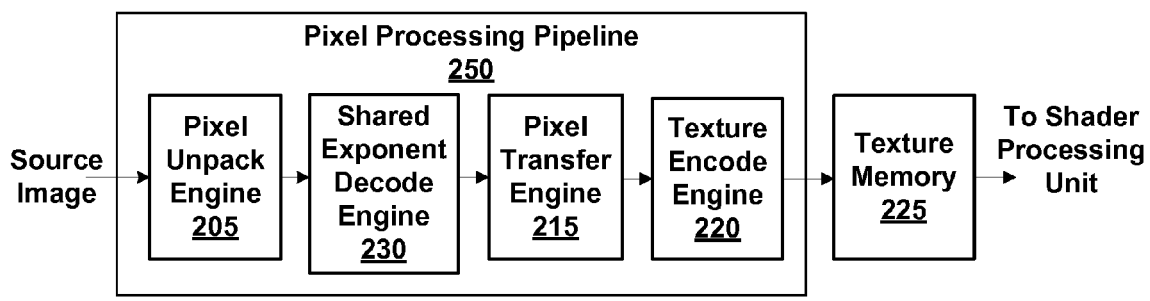
FIG. 2B is a block diagram illustrating another pixel processing pipeline including a decoding engine in accordance with one embodiment of the present invention.

FIG. 2B is a block diagram illustrating a pixel processing pipeline 250 including a shared exponent decode engine 230, in accordance with one embodiment of the present invention. Shared exponent decode engine 230 is provided by the 3D graphics API extension and is used to decode component values represented in the shared exponent format after the unpacking of pixel components including the shared exponent by pixel unpack engine 205 and prior to processing by pixel transfer engine 215. The inclusion of shared exponent decode engine 230 in pixel processing pipeline 250 allows an application to specify a source image that is represented in the shared exponent format and to process that source image using the conventional functions provided by pixel transfer engine 215. Therefore, compatibility with existing pixel processing functionality defined by the OpenGL specification is maintained.

The pixel unpack engine 205 and a pixel transfer engine 215 of pixel processing pipelines 200 and 250 may be embodied as a software program or as circuitry designed to execute specific function calls for pixel processing defined by the OpenGL specification and provided in the form of a 3D graphics library. Similarly, texture encode engine 220 and shared exponent decode engine 230 may be embodied as a software program or as circuitry designed to execute functions for specifying and processing source image data to/from the shared exponent format defined by the 3D graphics API extension.

Figure 3A:
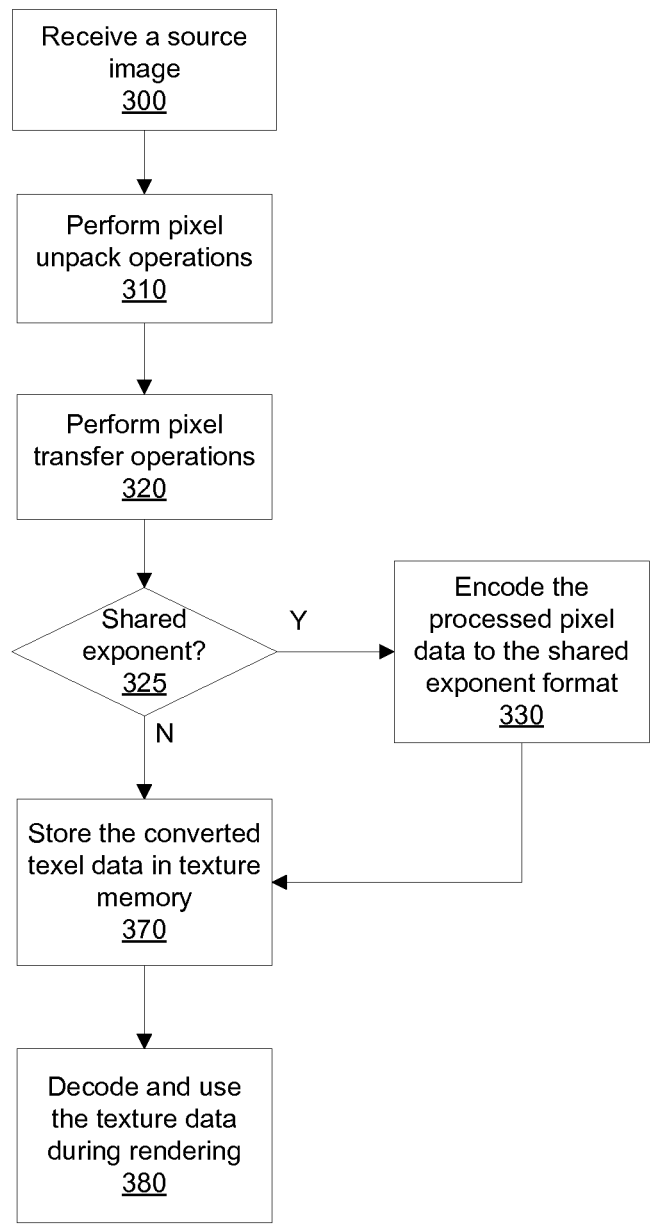
FIG. 3A illustrates a flow diagram of method steps for specifying image data encoded using the shared exponent format through the pixel processing pipeline of FIG. 2A in accordance with one embodiment of the present invention.

FIG. 3A illustrates a flow diagram of method steps for specifying the shared exponent format for a source image through pixel processing pipeline 200 of FIG. 2A, in accordance with one embodiment of the present invention. The method shown in FIG. 3A may be used to perform the glTexlmage2D OpenGL function to produce texture data in the shared exponent format. In step 300 pixel unpack engine 205 receives a source image specified by an application. The application may specify that the source image be stored in the shared exponent format provided by the 3D graphics API extension. In step 310 pixel unpack engine 205 performs pixel unpack operations known to those skilled in the art to produce an array of values representing components of the source image. Note that the source image may be conventional image data, such as color components, or the source image data may be other types of data that is also suitable for use as a texture map, e.g., light intensity, height fields, displacement data, or the like.

In step 320 pixel transfer engine 215 is configured to perform pixel transfer operations on the component values, such as scaling, biasing, matrix operations, convolution, and the like. In particular, pixel transfer engine 215 may be configured to perform data conversions, such as color conversions or floating point to/from fixed point format conversions. In step 325 texture encode engine 220 determines is the shared exponent format is specified as the output data format for the source image, and, if not, texture encode engine 220 proceeds directly to step 370. Otherwise, in step 330 texture encode engine 220 processes the processed component values to produce shared exponent texture data, as described in conjunction with FIG. 3B.

In step 370 the encoded texture data is output by texture encode engine 220 for storage in texture memory 225 as a texture map. In some embodiments of the present invention, the texture data may be filtered to produce mipmapped texture maps that include two or more level of detail textures for a single source image. In step 380 the texture data is read from texture memory 225 and decoded for use during shading operations.

In a conventional pixel processing pipeline that is not configured to process the shared exponent format, conversion to the shared exponent format may be performed by the application before the data is stored for use as a texture map. Including shared exponent format encoding in the pixel processing pipeline allows for the conversion of pixel components to be performed in the pixel pipeline in addition to the conventional pixel processing pipeline operations provided by pixel unpack engine 205 and pixel transfer engine 215. It is desirable to maintain compatibility with the existing pixel processing pipeline, i.e., existing graphics library functions, while adding the ability to conserve memory space by encoding high dynamic range image data into the shared exponent format. Furthermore, it is desirable to offload the format conversion processing from the application by performing the format conversion in the pixel pipeline.

Figure 3B:
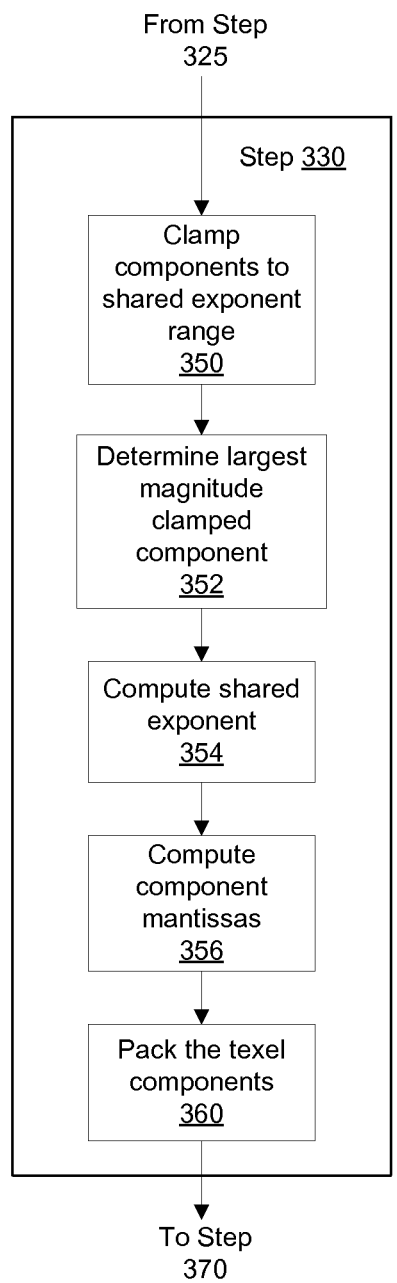
FIG. 3B illustrates an embodiment of a method for encoding image data in accordance with one embodiment of the present invention.

FIG. 3B illustrates an embodiment of a method for encoding image data, as shown in step 330 of FIG. 3A, in accordance with one embodiment of the present invention. In step 350 texture encode engine 220 clamps the components to the shared exponent range. For example, when the shared exponent format is a 5 bit exponent and a 9 bit mantissa with an implied leading zero, the equations shown in TABLE 1 may be used to perform step 350, where sharedexp_max is the maximum value represented by a 9 bit mantissa and 5 bit exponent.

TABLE 1 red_c = max(0, min(sharedexp_max, red))
green_c = max(0, min(sharedexp_max, green))
blue_c = max(0, min(sharedexp_max, blue))

sharedexp_max is $(2^N-1)/2^N * 2^{(Emax-B)}$, where N is the number of mantissa bits per component, Emax is the maximum allowed biased exponent value, and B is the exponent bias. For the GL_RGB9_E5_EXT format, N=9, Emax=30, and B=15. Note that Emax is not necessarily $2^E-1$ when E is the number of exponent bits. Note that NaN (not a number) values are mapped to 0. Note that positive Infinity is mapped to sharedexp_max as are all values that exceed sharedexp_max.

In step 352 texture encode engine 220 determines the largest magnitude clamped component, max_c, for each texel using the following equation: max_c=max(red_c, green_c, blue_c). In step 354 texture encode engine 220 computes the shared exponent, exp_shared=max(-B-1, floor(log 2(max_c)))+1+B. In step 356 texture encode engine 220 computes the component mantissas for the shared exponent format. For example, when the shared exponent format is a 5 bit exponent and a 9 bit mantissa with an implied leading zero, the equations shown in TABLE 2 may be used to perform step 356 to compute the mantissas as integer values in the range of 0 to $2^N-1$.

TABLE 2 red_s = floor(red_c / $2^{(exp\_shared - B + N)}$ + 0.5)
green_s = floor(green_c / $2^{(exp\_shared - B + N)}$ + 0.5)
blue_s = floor(blue_c / $2^{(exp\_shared - B + N)}$ + 0.5)

In step 360 texture encode engine 220 packs the texel component mantissas and the shared exponent for each texel and texture encode engine 220 proceeds to step 370 of FIG. 3A. The single 5-bit exponent is stored as an unsigned value biased by 15 and there is a 9-bit mantissa for each component. There are no sign bits because all of the components should be non-negative due to the clamping in step 350. The fractional mantissas assume an implied zero left of the decimal point because having an implied leading one is inconsistent with sharing the exponent. Finally, neither infinity nor Not-a-Number (NaN) is representable using the shared exponent format. The shared exponent format using a 5 bit exponent and 9 bit mantissas closely matches the range and precision of the half-precision floating-point format described in the ARB_half_float_pixel and ARB_texture_float specifications that uses a 5 bit exponent and 10 bit mantissa for each exponent. In some embodiments of the present invention both signed and unsigned values may be represented by using a 5 bit exponent that is shared between 8 bit mantissas that each have a corresponding sign bit.

Figure 3C:
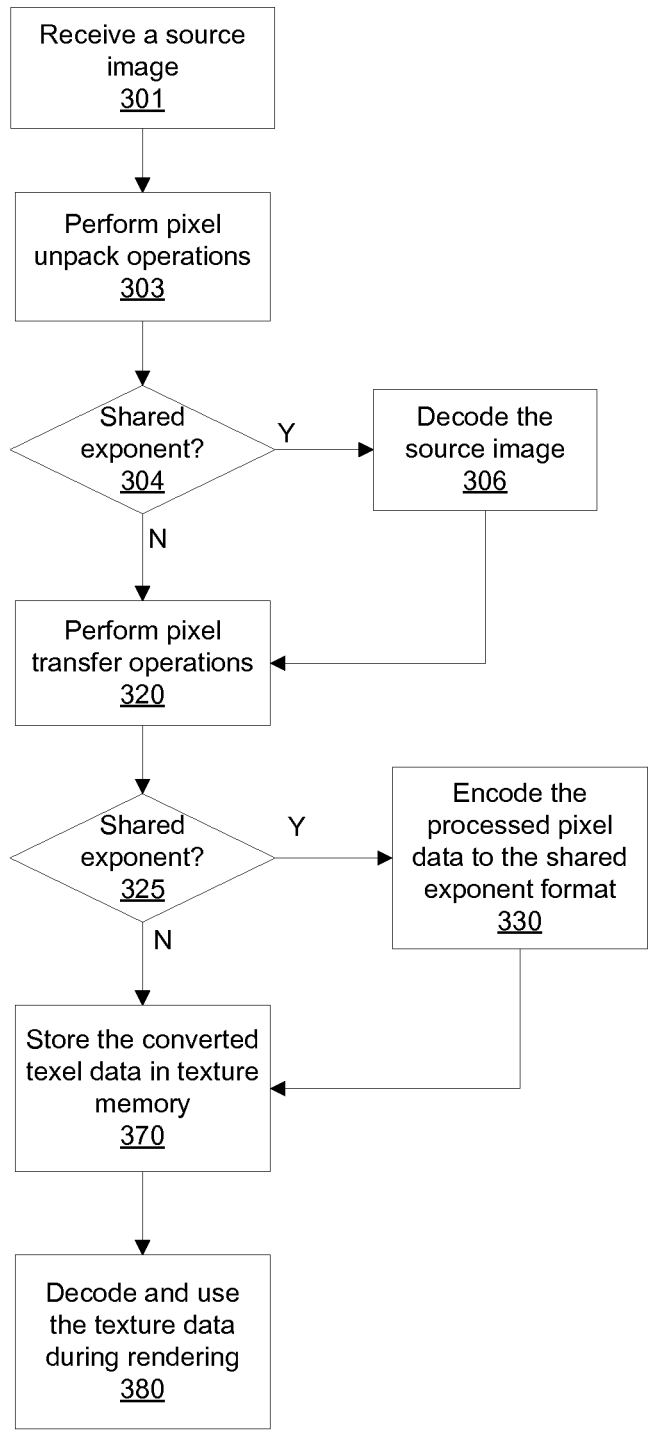
FIG. 3C illustrates a flow diagram of method steps for specifying image data for encoding to or decoding from the shared exponent format through the pixel processing pipeline of FIG. 2B in accordance with one embodiment of the present invention.

FIG. 3C illustrates a flow diagram of method steps for specifying image data for encoding to or decoding from the shared exponent format through pixel processing pipeline 250 of FIG. 2B, in accordance with one embodiment of the present invention. The method shown in FIG. 3C may be used to perform the glTexImage2D OpenGL function to decode a source image represented in the shared exponent format and/or encode texture data into the shared exponent format while maintaining compatibility with the pixel pipeline functions specified by OpenGL.

In step 301 pixel processing pipeline 250 receives a source image specified by an application. The image is unpacked into pixel components by step 303. The application may specify that the source image is represented in the shared exponent format provided by the 3D graphics API extension. After unpacking, in step 304 shared exponent decode engine 230 determines if the source image is represented in the shared exponent format, and, if not, then the source image is output to pixel transfer engine 215. Otherwise, in step 306 shared exponent decode engine 230 decodes the unpacked source components assuming the shared exponent format to produce floating point data with an exponent for each mantissa. For example, when the shared exponent format is a 5 bit exponent and a 9 bit mantissa with an implied leading one, the equations shown in TABLE 3 may be used to perform step 306 to compute the decoded component values. The unpacked components red_s, green_s, blue_s, and exp- _shared values are processed as unsigned integers and are decoded to red, green, and blue components.

TABLE 3

$$red = red\_s * 2^{(exp\_shared - B)}$$
$$green = green\_s * 2^{(exp\_shared - B)}$$
$$blue = blue\_s * 2^{(exp\_shared - B)}$$

Steps 320, 325, 330, 370, and 380 are completed as previously described in conjunction with FIGS. 3A and 3B.

Figure 4A:
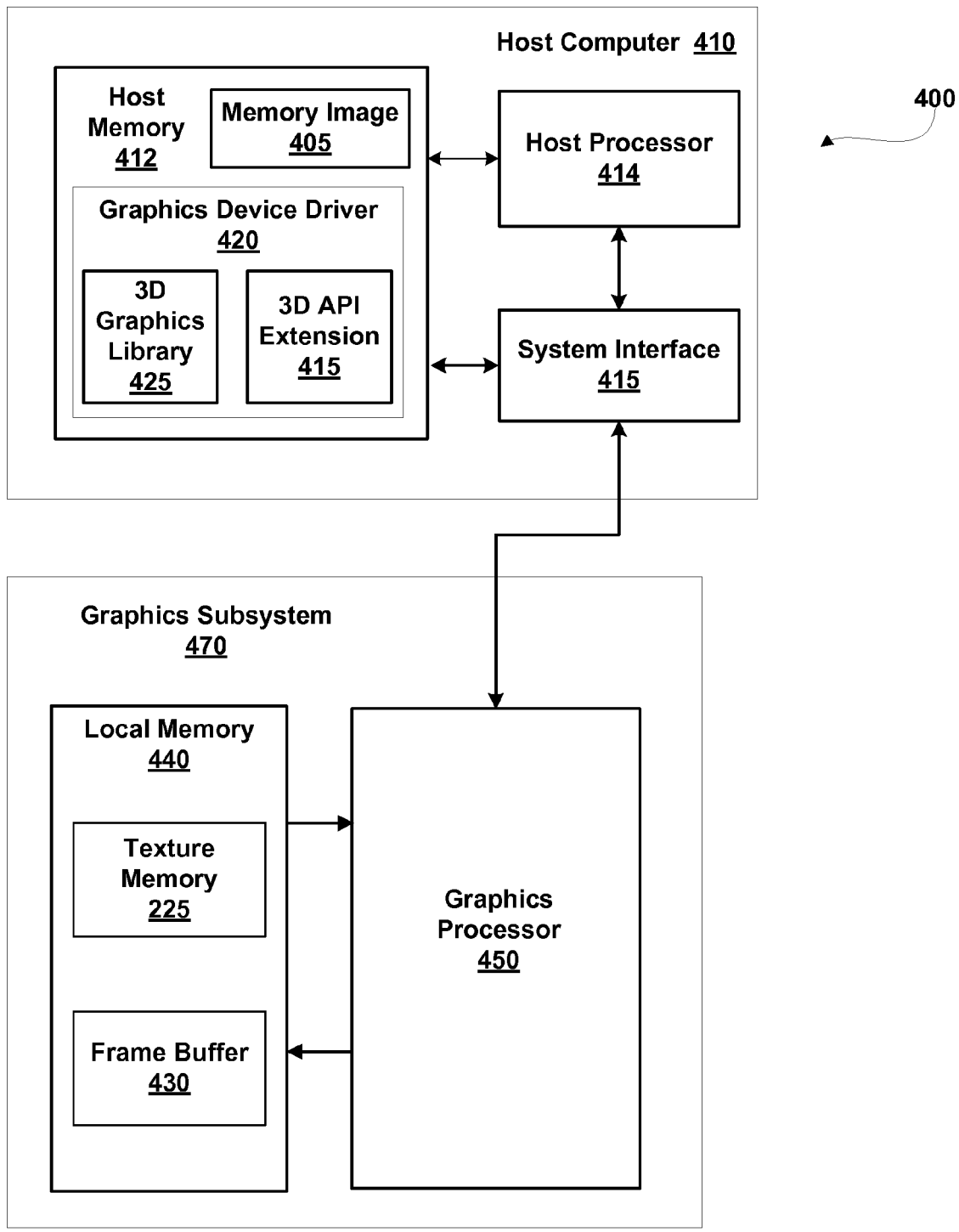
FIG. 4A illustrates one embodiment of a computing system including a host computer and a graphics subsystem in accordance with one embodiment of the present invention.

FIG. 4A illustrates one embodiment of a computing system 400 including a host computer 410 and a graphics subsystem 470, in accordance with one embodiment of the present invention. Computing system 400 may be a desktop computer, server, laptop computer, palm-sized computer, tablet computer, game console, cellular telephone, computer based simulator, or the like. Host computer 410 includes host processor 414 that may include a system memory controller to interface directly to host memory 412 or may communicate with host memory 412 through a system interface 415. System interface 415 may be an I/O (input/output) interface or a bridge device including the system memory controller to interface directly to host memory 412.

A graphics device driver 420 is stored in host memory 412 and includes 3D graphics library 425 and 3D API extension 415. Graphics device driver 420 is configured to interface between applications using functions provided by 3D graphics library 425 and 3D API extension 415 and a graphics subsystem 470. Graphics device driver 420 translates instructions for execution by graphics processor 450 based on the specific capabilities of graphics processor 450. In some embodiments of the present invention, graphics device driver 420 is configured to perform the format encoding to and decoding from the internal format specified by the application using graphics processor 450. Offloading the format encoding and decoding to graphics processor 450 may improve the encoding and decoding performance.

3D graphics API extension 415 provides shared exponent format encode and decode support for 3D graphics library 425. A memory image 405 is stored in host memory 412 for processing using functions provided by 3D graphics library 425 and 3D API extension 415 to produce image data, including component values encoded using the shared exponent format and/or decoded from the shared exponent format. Alternatively the memory image may reside in local memory 440 (not shown). 3D graphics library 425 provides function calls for graphics processing, including operations performed by pixel unpack engine 205 and pixel transfer engine 215. Likewise, 3D API extension 415 provides the functions of texture encode engine 220 and shared exponent decode engine 230 for use with 3D graphics library 425.

Host computer 410 communicates with graphics subsystem 470 via system interface 415. Data received by graphics processor 450 can be processed by a graphics pipeline within graphics processor 450 or written to a local memory 440. Graphics processor 450 uses graphics memory to store graphics data and program instructions, where graphics data is any data that is input to or output from units within graphics processor 450. Graphics memory can include portions of host memory 412, local memory 440, register files coupled to the components within graphics processor 450, and the like. Graphics processor 450 includes one or more processing units that may each read and/or write graphics memory. In alternate embodiments, host processor 414, graphics processor 450, system interface 415, or any combination thereof, may be integrated into a single processing unit. Further, the functionality of graphics processor 450 may be included in a chip set or in some other type of special purpose processing unit or co-processor.

In a typical implementation graphics processor 450 performs geometry computations, rasterization, pixel texture mapping and shading computations and raster operations. Texel components provided by pixel processing pipeline 200 or 250 are stored in texture memory 225 within local memory 440. The texel components represented in the shared exponent format may be read and decoded by graphics processor 450 for use during the execution of graphics processing programs. Specifically, the texture data may be used during the processing of geometry, vertex, or pixel data. Pixel components provided by pixel processing pipeline 200 or 250 are stored in frame buffer 430 within local memory 440. The pixel components represented in the shared exponent format may be read and decoded by graphics processor 450 for use during the execution of graphics processing programs. In particular, the pixel components may be read during raster operations.

When the data received by graphics subsystem 470 has been completely processed by graphics processor 450 outputs processed graphics data to a frame buffer 430 within local memory 440. In particular, source image data that is produced by graphics processor 450 may be stored in frame buffer 430 and provided to pixel processing pipeline 200 or 250 for encoding. Source image data that includes either signed or unsigned components may then be encoded and stored as an encoded texture map in texture memory 225 when texture encode engine 220 is included in pixel processing pipeline 200 or 250. Therefore, image data may be read from frame buffer 430 and provided to pixel processing pipeline 200 or 250 directly without requiring intervention by a graphics application to copy the image data to host memory 412. As previously described, the functionality of texture encode engine 220 may be provided using 3D API extension 415.

In some embodiments of the present invention, graphics processor 450 is optionally configured to deliver data to a display device, network, electronic control system, other computing system 400, other graphics subsystem 470, or the like. Alternatively, data is output to a film recording device or written to a peripheral device, e.g., disk drive, tape, compact disk, or the like.

Figure 4B:
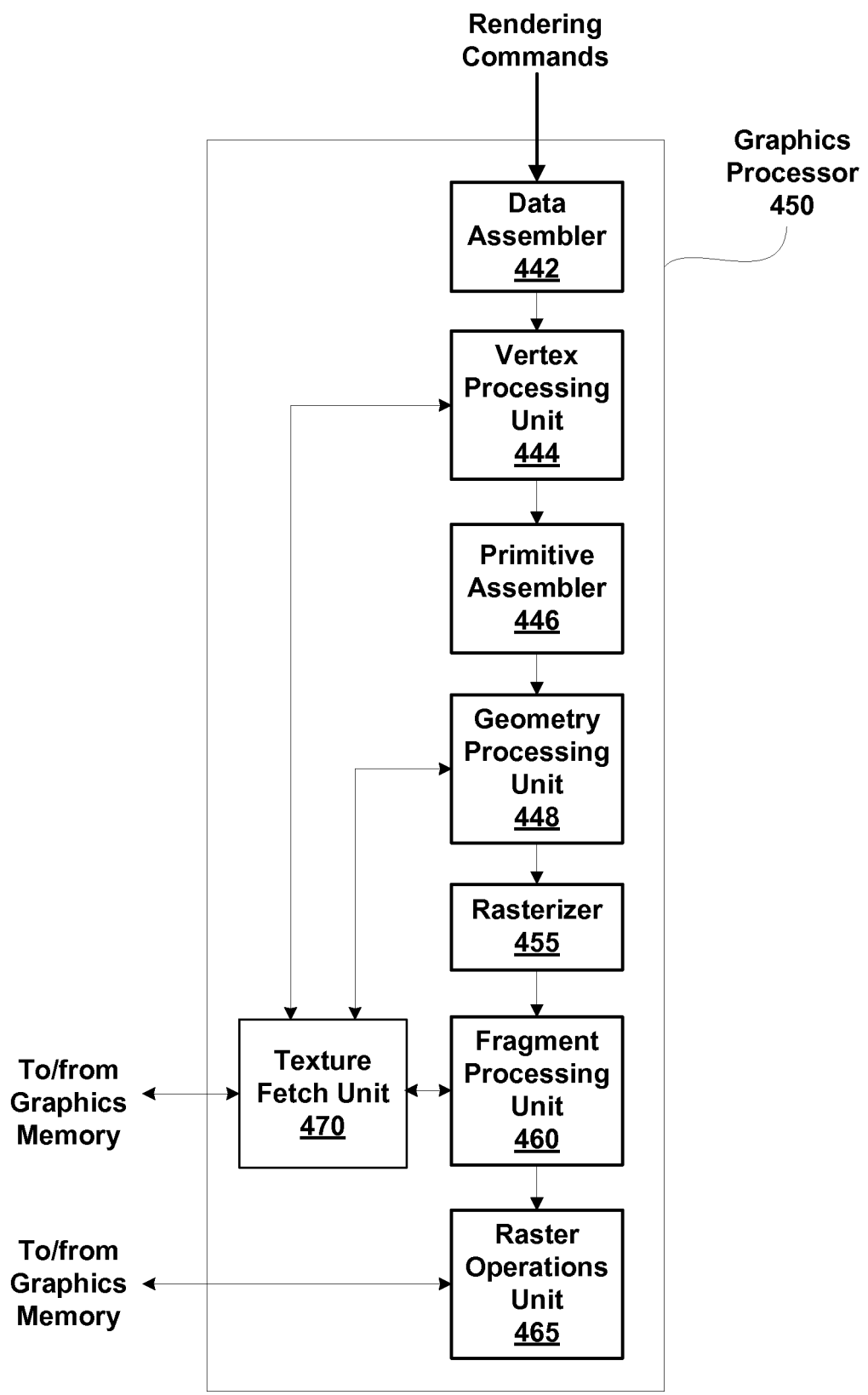
FIG. 4B illustrates the graphics processor of FIG. 4A in accordance with one embodiment of the present invention.

FIG. 4B illustrates the graphics processor of FIG. 4A in accordance with one embodiment of the present invention. Graphics processor 450 includes a data assembler 442, vertex processing unit 444, a primitive assembler 446, geometry processing unit 448, a rasterizer 455, fragment processing unit 460, and a raster operations unit 465. Data assembler 442 is a fixed function unit that collects vertex data for high-order surfaces, primitives, and the like, and outputs the vertex data to vertex processing unit 444. Vertex processing unit 444 is a programmable execution unit that is configured to execute vertex shader programs, transforming vertex data as specified by the vertex shader programs. For example, vertex processing unit 444 may be programmed to transform the vertex data from an object-based coordinate representation (object space) to an alternatively based coordinate system such as world space or normalized device coordinates (NDC) space. Vertex processing unit 444 may read texture map data that is stored in local memory 440 through an interface for use in processing the vertex data.

Primitive assembler 446 receives processed vertex data from vertex processing unit 444 and constructs graphics primitives, e.g., points, lines, triangles, or the like, for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. Geometry processing unit 448 outputs the parameters and new graphics primitives to rasterizer 455. Geometry processing unit 448 may read texture map data that is stored in local memory 440 through an interface for use in processing the geometry data.

Rasterizer 455 scan converts the new graphics primitives and outputs fragments and coverage data to fragment processing unit 260. Fragment processing unit 460 is a programmable execution unit that is configured to execute fragment shader programs, transforming fragments received from rasterizer 455 as specified by the fragment shader programs. For example, Fragment processing unit 460 may be programmed to perform operations such as perspective correction, texture mapping, shading, blending, and the like, to produce shaded fragments that are output to raster operations unit 465. Fragment processing unit 460 may read texture map data that is stored in local memory 440 through a texture fetch unit 470 for use in processing the fragment data. Texture fetch unit 470 produces read requests for texels, decodes texel components represented in the shared exponent format, and performs texture filtering operations, e.g., bilinear, trilinear, anisotropic, and the like, as described in conjunction with FIG. 4C. Raster operations unit 465 is a fixed function unit that optionally performs near and far plane clipping and raster operations, such as stencil, z test, and the like, and outputs pixel data as processed graphics data for storage in graphics memory.

Figure 4C:
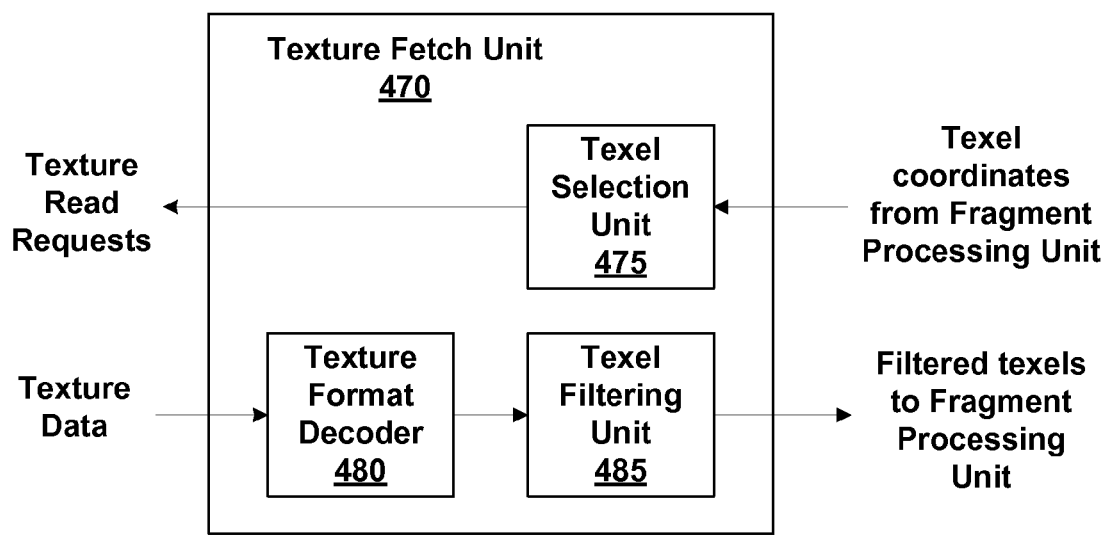
FIG. 4C illustrates the texture fetch unit of FIG. 4B in accordance with one embodiment of the present invention.

FIG. 4C illustrates texture fetch unit 470 of FIG. 4B, in accordance with one embodiment of the present invention. Texture fetch unit 470 includes a texel selection unit 475, a texture format decoder 480, and a texture filtering unit 485. Texture selection unit 475 determines which texels should be read based on the texture map coordinates and computes the addresses for read requests. Texture format decoder 480 receives the texture data for the texels and decodes the components that are represented in the shared exponent format to expand each component to a fixed-point representation or floating-point representation with an exponent for each component. Texture format decoder 480 may also be configured to perform other format conversions, e.g., float to integer, decompression, or the like.

Texture filtering unit 485 receives the converted texture data and performs point sampling, bilinear filtering, trilinear filtering, or anisotropic filtering to produce filtered texel values that are output to fragment processing unit 460. In some embodiments of the present invention additional texture fetch units 470 are coupled to other processing units within graphics processor 450, such as vertex processing unit 444 and geometry processing unit 448 to allow those units to read texture data for processing.

Figure 5:
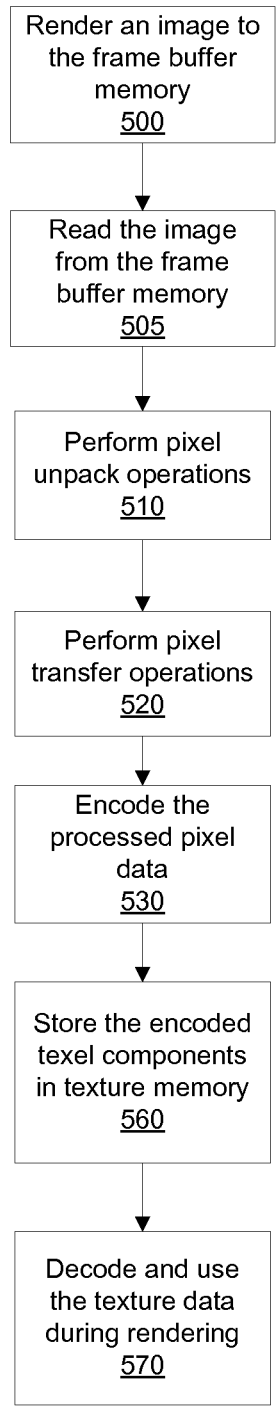
FIG. 5 illustrates another flow diagram of method steps for specifying shared exponent format textures through the pixel processing pipeline of FIG. 2 in accordance with one embodiment of the present invention.

FIG. 5 illustrates another flow diagram of method steps for specifying image data in a shared exponent format through pixel processing pipeline 200 or 250 of FIGS. 2A and 2B, in accordance with one embodiment of the present invention. The method shown in FIG. 5 may be used to perform the glCopyTexImage OpenGL function to copy a source image to a texture that is represented in the shared exponent format while maintaining compatibility with the pixel pipeline functions specified by OpenGL.

In step 500 graphics processor 450 renders an image and stores the image in frame buffer 430 of local memory 440. The image may be specified using 3D graphics library 425 as a source image for processing by pixel processing pipeline 200. For example, a pointer to a memory location in frame buffer 430 may be provided along with a source format. A destination location within texture memory 225 may be specified with a destination (internal) format as provided by 3D API extension 415 of shared exponent format texture components. In step 505 pixel processing pipeline 200 reads the image from frame buffer 430 for processing as a source image. Steps 510, 520, 530, 560 and 570 correspond to steps 303, 320, 330, 370, and 380 of FIG. 3A, respectively, and are performed as previously described to produce shared exponent format texel components for storage in texture memory 225 and use during rendering.

Figure 6A:
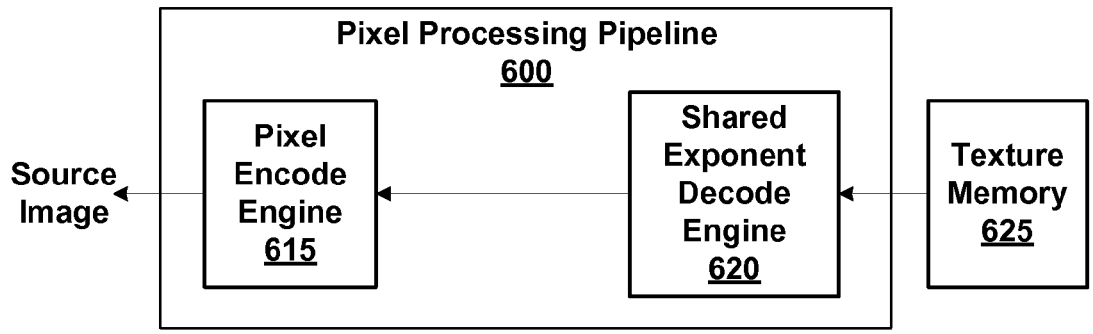
FIG. 6A is a block diagram illustrating another pixel processing pipeline including an encoding and a decoding engine in accordance with one embodiment of the present invention.

FIG. 6A is a block diagram illustrating another pixel processing pipeline, pixel processing pipeline 600, that includes a pixel encode engine 615 and a shared exponent decode engine 620, in accordance with one embodiment of the present invention. Pixel processing pipeline 600 may be used to perform the glGetTexImage OpenGL function to read a texture stored in the shared exponent format and convert the texture into another format. Texture data represented in the shared exponent format is read from texture memory 625 by pixel processing pipeline 600. Shared exponent decode engine 620 is configured to decode the components represented in the shared exponent format and produce expanded texture components. Pixel encode engine 615 is configured to convert texture components that are not represented in the shared exponent format into the shared exponent format and output that converted texture components as a source image for storage in a portion of host memory 412 allocated to an application or frame buffer 430.

Pixel processing pipeline 600 may be used in various texture image query modes to convert texture data to/from the shared exponent format. For example, a texture map represented in the shared exponent format may be read and converted to a fixed-point format or conventional floating-point format. Conversely, a texture map represented in a fixed-point or conventional floating-point format may be read and converted to the shared exponent format. Pixel processing pipeline 600 may also be used to perform an optimized memory-to-memory transfer in order to copy a texture map represented in the shared exponent format to a source image represented in the shared exponent format.

Figure 6B:
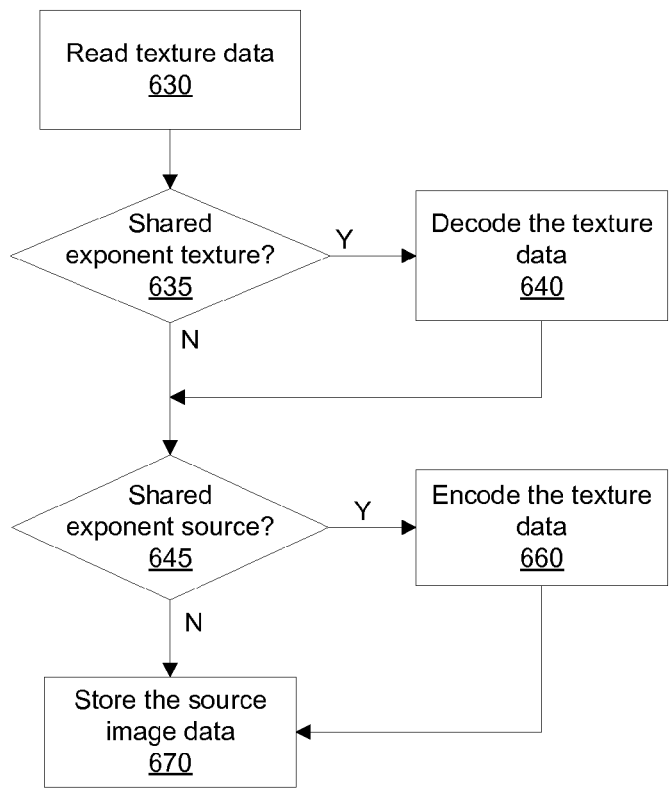
FIG. 6B illustrates another flow diagram of method steps for specifying shared exponent format textures through the pixel processing pipeline of FIG. 6A in accordance with one embodiment of the present invention.

FIG. 6B illustrates another flow diagram of method steps for specifying shared exponent format textures through the pixel processing pipeline 600 of FIG. 6A, in accordance with one embodiment of the present invention. The method shown in FIG. 6B may be used to perform the glGetTexImage OpenGL function to copy to a destination memory image from a texture when both the destination image and texture may or may not be represented in the shared exponent format while maintaining compatibility with the texture query behavior specified by OpenGL.

In step 630 pixel processing pipeline 600 reads the texture data from texture memory 625. In step 635 shared exponent decode engine 620 determines if the texture data is represented in the shared exponent format, and, if so, in step 640 shared exponent decode engine 620 decodes the texture data, outputs the expanded texture data to pixel encode engine 615, and proceeds to step 645. If, in step 635 shared exponent decode engine 620 determines that the texture data is not represented in the shared exponent format, then shared exponent decode engine 620 outputs the texture data to pixel encode engine 615.

In step 645 pixel encode engine 615 determines if the shared exponent format is specified for the destination image, and, if so in step 660 the texture data or expanded texture data received from shared exponent decode engine 620 is encoded into the shared exponent format and output as the destination image data by pixel encode engine 615. If, in step 645 pixel encode engine 615 determines that the shared exponent format is not specified for the source image, then pixel encode engine 615 outputs the texture data or expanded texture data as the source image data. In step 670 the destination image data output by pixel encode engine 615 is stored in a portion of host memory 412 allocated to an application or local memory 440. In some embodiments of the present invention, when the shared exponent format is specified for the texture data and the source image, pixel processing pipeline 600 is configured in a pass-through mode and the texture data is transferred without changing the format.

Figure 7A:
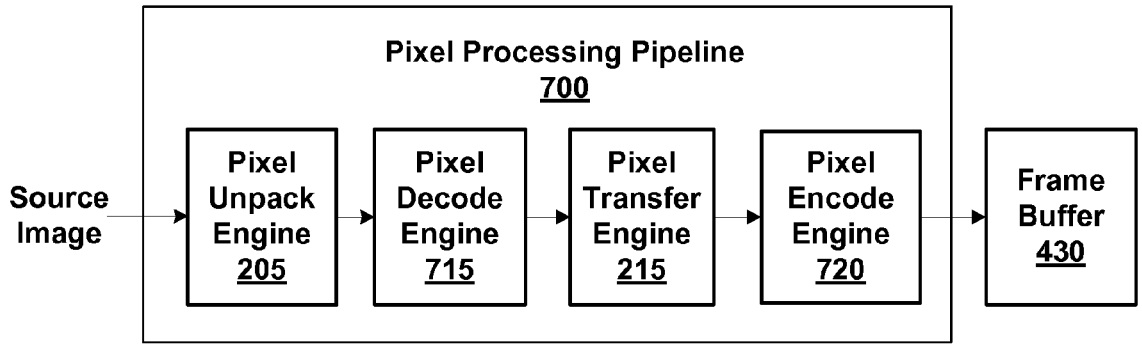
FIG. 7A is a block diagram illustrating another pixel processing pipeline including an encoding and a decoding engine in accordance with one embodiment of the present invention.

FIG. 7A is a block diagram illustrating another pixel processing pipeline, pixel processing pipeline 700 that includes a pixel encode engine 720 and a pixel decode engine 715, in accordance with one embodiment of the present invention. Pixel processing pipeline 700 may be used to perform the glDrawPixels OpenGL function to write pixels represented in the shared exponent format in frame buffer 430. In particular, pixel processing pipeline 700 may be used to convert a high dynamic range source image represented in a conventional floating point format into the compact shared exponent format. The source image is provided to pixel processing pipeline 700 and unpacked by pixel unpack engine 205. Then pixel decode engine 715 is configured to decode the source image into another format as needed for processing by pixel transfer engine 215. In some embodiments of the present invention, pixel decode engine 715 is configured to decode the components represented in the shared exponent format and produce expanded texture components represented in a conventional format. In other embodiments of the present invention, pixel decode engine 715 may be bypassed and the source image may be provided by the application in a format that can be processed by pixel transfer engine 215.

Pixel transfer engine 215 process the decoded source image and produce processed source image components. Pixel encode engine 720 is configured to convert processed source image components that are not represented in the shared exponent format into the shared exponent format and output the converted components as a pixel image for storage in frame buffer 430.

Figure 7B:
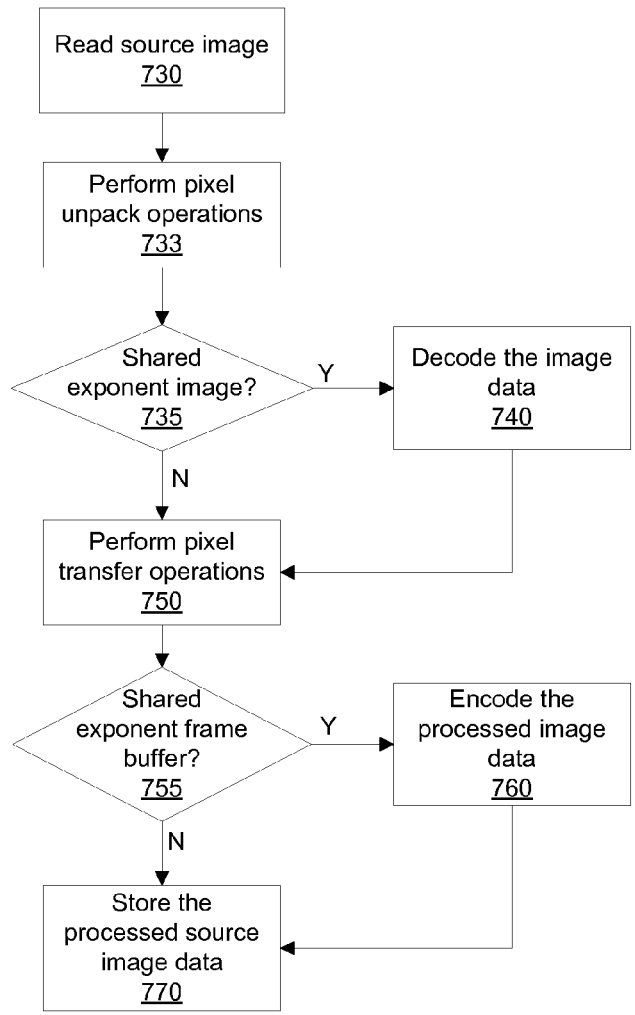
FIG. 7B another flow diagram of method steps for specifying shared exponent format images through the pixel processing pipeline of FIG. 7A in accordance with one embodiment of the present invention.

FIG. 7B illustrates another flow diagram of method steps for specifying shared exponent format images through pixel processing pipeline 700 of FIG. 7A, in accordance with one embodiment of the present invention. The method shown in FIG. 7B may be used to perform the glDrawPixels OpenGL function to convert a source image to image data that is represented in the shared exponent format while maintaining compatibility with the pixel pipeline functions specified by OpenGL.

In step 730 pixel processing pipeline 700 reads the source image data from a location in graphics memory specified by a function call. The data is unpacked into components by step 733. In step 735 pixel decode engine 715 determines if the source image is represented in the shared exponent format, and, if so, in step 740 pixel decode engine 715 decodes the source image data, outputs the expanded source image data to pixel transfer engine 215, and proceeds to step 750. If, in step 735 pixel decode engine 715 determines that the source image is not represented in the shared exponent format, then pixel decode engine 715 outputs the source image to pixel transfer engine 215.

In step 750 pixel transfer engine 215 performs pixel transfer operations on the unpacked source image data. In step 755 pixel encode engine 720 determines if the shared exponent format is specified for the destination image to be stored in frame buffer 430, and, if so in step 760 the processed source image data received from pixel transfer engine 215 is encoded into the shared exponent format and output as the destination image data by pixel encode engine 720. If, in step 755 pixel encode engine 720 determines that the shared exponent format is not specified for the destination image, then pixel encode engine 720 outputs the processed source image data as the destination image data. In step 770 the destination image data output by pixel encode engine 720 is stored in frame buffer 430. In some embodiments of the present invention, when the shared exponent format is specified for the source image data and the destination image, pixel processing pipeline 700 is configured in a pass-through mode and the source image data is transferred without changing the format.

Figure 8A:
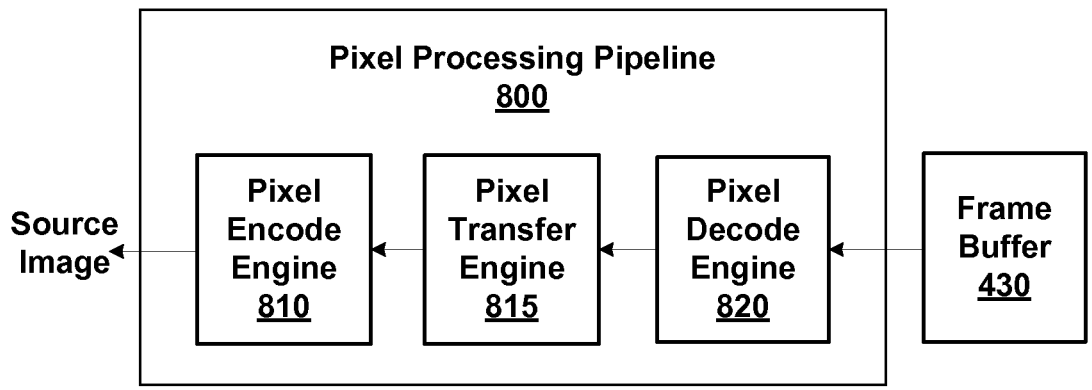
FIG. 8A is a block diagram illustrating another pixel processing pipeline including an encoding and a decoding engine in accordance with one embodiment of the present invention.

FIG. 8A is a block diagram illustrating another pixel processing pipeline, pixel processing pipeline 800 that includes a pixel encode engine 810 and a pixel decode engine 820, in accordance with one embodiment of the present invention. Pixel processing pipeline 800 may be used to perform the glReadPixels OpenGL function to read pixels from frame buffer 430 and converts the pixels into the shared exponent format. In particular, pixel processing pipeline 800 may be used to convert a high dynamic range image rendered into frame buffer 430 in a conventional floating point format into the compact shared exponent format. The rendered image is provided to pixel processing pipeline 800 and pixel decode engine 820 is configured to decode the rendered image into another format as needed for processing by pixel transfer engine 815. In some embodiments of the present invention, pixel decode engine 820 is configured to decode the components represented in the shared exponent format and produce expanded components represented in a conventional format.

Pixel transfer engine 815 processes the decoded rendered image and produces processed rendered image components. Pixel encode engine 810 is configured to convert processed rendered image components that are not represented in the shared exponent format into the shared exponent format and output the converted components as a source image. In some embodiments of the present invention, pixel encode engine 810 is configured to convert the processed rendered image components into conventional integer or floating point data formats in addition to the shared exponent format.

Figure 8B:
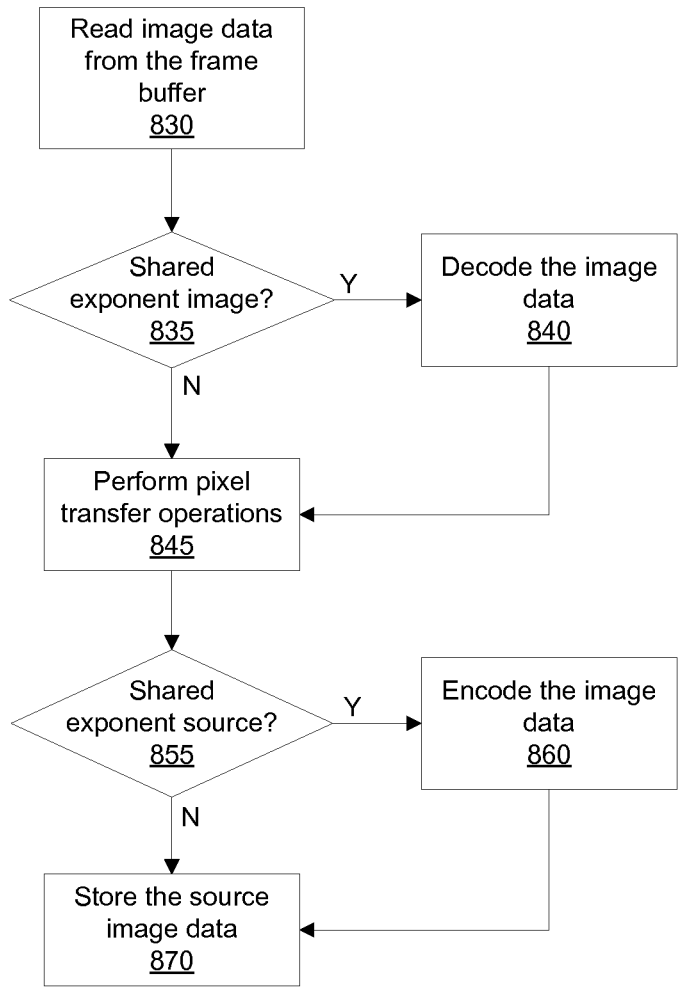
FIG. 8B illustrates another flow diagram of method steps for specifying shared exponent format images through the pixel processing pipeline of FIG. 8A in accordance with one embodiment of the present invention.

FIG. 8B illustrates another flow diagram of method steps for specifying shared exponent format images through pixel processing pipeline 800 of FIG. 8A, in accordance with one embodiment of the present invention. The method shown in FIG. 8B may be used to perform the glReadPixels OpenGL function to convert a rendered image to a source image that is represented in the shared exponent format while maintaining compatibility with the pixel pipeline functions specified by OpenGL.

In step 830 pixel processing pipeline 800 reads the rendered image data from a location in frame buffer 430 specified by a function call. In step 835 pixel decode engine 820 determines if the rendered image is represented in the shared exponent format, and, if so, in step 840 pixel decode engine 820 decodes the rendered image data, outputs the expanded rendered image data to pixel transfer engine 815, and proceeds to step 845. If, in step 835 pixel decode engine 820 determines that the rendered image is not represented in the shared exponent format, then pixel decode engine 820 outputs the rendered image to pixel transfer engine 815 without decoding the rendered image data.

In step 845 pixel transfer engine 815 performs pixel transfer operations on the rendered image data or expanded rendered image data to produce processed image data. In step 855 pixel encode engine 810 determines if the shared exponent format is specified for the source image to be stored in a portion of host memory 412 that is allocated to the application, and, if so, in step 860 the processed image data received from pixel transfer engine 815 is encoded into the shared exponent format and output as the source image data by pixel encode engine 810. If, in step 855 pixel encode engine 810 determines that the shared exponent format is not specified for the source image, then pixel encode engine 810 outputs the processed image data as the source image data. In step 870 the source image data output by pixel encode engine 820 is stored in host memory 412. In some embodiments of the present invention, when the shared exponent format is specified for the rendered image data and the source image, pixel processing pipeline 800 is configured in a pass-through mode and the rendered image data is transferred without changing the format.

High dynamic range image data may be stored in the compact shared exponent format provided by the 3D graphics API extension while requiring less memory than conventional floating point formats that are typically used to represent high dynamic range data. Furthermore, using a 3D graphics API extension to add support for the shared exponent format maintains compatibility with existing pixel processing while adding the ability to conserve memory space. The 3D graphic API extension allows for an application to provide an image in a conventional format without requiring the application to perform the encoding to the shared exponent format or the decoding from the shared exponent format. Therefore, applications may seamlessly specify the new shared exponent format for image data and save memory space needed to store the image while maintaining the capability to execute conventional graphics library function calls. Applications may also pre-encode image data in the shared exponent format and specify a different format or the shared exponent format for the destination (internal format).

One embodiment of the shared exponent format that may be used to represent image components includes a 5 bit shared exponent and three 9 bit mantissas, each with an implied leading zero. An advantage of using a 5 bit shared exponent rather than an 8-bit shared exponent is that the 5 bit exponent allows for more bits to be allocated to the mantissa while fitting three components into a 32 bit word. Having an extra bit of precision for each component is advantageous in situations where a high magnitude component dominates a low magnitude component. Furthermore, graphics processors that are configured to process a conventional half-precision floating point format with a 5 bit exponent and 10 bit mantissa for each component existing filtering units for textures represented in the expanded shared exponent format. The allocation of three 9-bit mantissas and a shared 5-bit exponent without signed bits is well-suited to storing RGB color values with high dynamic range, but other embodiments may allocate the number of bits and components differently to better match domain-specific requirements.

With conventional floating-point formats, the number corresponding to a finite, non-denormalized, non-zero floating-point value is value=$-1^{sign}*2^{(exponent-bias)}*1.frac$. Sign is the sign bit (1 is a negative sign and 0 is a positive sign). Exponent is an (unsigned) biased exponent and bias is the constant bias for the format that is subtracted to get the unbiased (possibly negative) exponent. frac is the fractional portion of the mantissa with the "1." indicating an implied leading one. An exp value of zero indicates so-called denormalized values. With conventional floating-point formats, the number corresponding to a denormalized floating-point value is value=$-1^{sgn}*2^{(exp-bias+1)}*0.frac$. The only difference between the denormalized and non-denormalized case is that the bias is one greater in the denormalized case and the implied leading digit is a zero instead of a one. While conventional floating-point formats use an implied leading one for non-denormalized, finite values, a shared exponent format does not use an implied leading one because each component may have a different magnitude for its most-significant binary digit.

The largest biased exponent for a conventional floating point format (31 for the half-precision floating point format and 127 for a 32 bit IEEE floating point format) indicates Infinity and NaN values. This means these two extrema exponent values are "off limits" and cannot be used to represent other values. There should be no "off limits" exponents for the shared exponent format since there is no requirement for representing Infinity or NaN values and denormalized is not a special case. Because of the implied leading zero, any component with all zeros for its mantissa is zero, no matter the shared exponent's value. Representing Infinity and NAN values limits the range of exponents for the conventional half-precision floating point format to between 1 and 30. In contrast, the shared exponent format consistently uses the same rule for all exponents from 0 to 31.

In the preferred embodiment of the present invention an exponent bias of 15 is used. The maximum value that can be represented by the half-precision floating point format results from an exponent of 30 and the binary mantissa of the implied leading one followed by ten fractional 1's. Therefore the maximum value that can be represented by the half-precision floating point format is $1.1111111111*2^{(30-15)}=1.1111111111*2^{15}$. The maximum value that can be represented by the shared exponent format is $0.111111111*2^{(31-15)}=0.111111111*2^{16}=1.11111111*2^{15}$. Ignoring only two least significant bits, these values are nearly identical.

The minimum non-zero representable value for the shared exponent format with a bias of 15 is $0.000000001*2^{(0-15)}=0.000000001*2^{-15}=0.0000000001*2^{-14}$. The minimum values for the shared exponent format and the half-precision floating point format match exactly for the exponent bias of 15. Therefore, the shared exponent format using a shared 5 bit exponent represents nearly the same range of finite values as the half-precision floating point format specified by the ARB_ texture_float extension. However, the half-precision floating point format requires 48 bits for three components and the shared exponent format requires only 32 bits. Therefore, the shared exponent format is more compact than the half-precision floating point format while maintaining nearly the same precision. It is advantageous to store image data in the shared exponent format since the image data will require less memory compared with the half-precision floating point format or a conventional 32 bit per component floating point format.

Persons skilled in the art will appreciate that any system configured to perform the method steps of FIG. 3A, 3B, 3C, 5, 6B, 7B, or 8B, or their equivalents, are within the scope of the present invention. A 3D graphics API extension provides support for specifying images in a shared exponent format. The shared exponent format is used to represent high dynamic range textures in a compact encoding to reduce the memory footprint needed to store the image data compared with other high dynamic range formats. Image data is encoded to and decoded from the shared exponent format using the pixel processing pipeline. Image data encoded into the shared exponent format can be decoded and used as texture data during rendering.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. One embodiment of the invention provides a computer readable medium storing instructions for causing a processor to provide uncompressed texture data for graphics processing by performing the steps of receiving source image data specified by an application program and a parameter that specifies the shared exponent format, processing the source image data using a pixel processing pipeline provided by function calls of a 3D graphics library to produce processed source image data, encoding the processed source image data into the shared exponent format to produce the image data represented in the shared exponent format, and transmitting the image data represented in the shared exponent format to a graphics memory for storage.

The invention claimed is:

1. A method for providing image data represented in shared exponent format for graphics processing, comprising:
receiving, from a three-dimensional (3D) graphics applications programming interface (API) extension, source image data specified by an application program, wherein the source image data is not represented in the shared exponent format;
receiving, from the 3D graphics API extension, a format parameter that specifies the shared exponent format for destination image data, wherein the shared exponent format has a shared exponent bias of 15 and a mantissa value of zero indicates an image component value of the destination image data is zero independent of a value of the shared exponent;
encoding, by a pixel processing pipeline instead of the application program, the source image data into the shared exponent format to produce the destination image data represented in the shared exponent format when the source image data is not represented in the shared exponent format specified by the format parameter; and
transmitting the destination image data represented in the shared exponent format to a graphics memory for storage.

2. The method of claim 1, further comprising storing the destination image data represented in the shared exponent format in a texture memory.

3. The method of claim 2, further comprising:
reading a texel represented in the shared exponent format from the destination image data stored in the texture memory; and
decoding the texel to produce expanded components for the graphics processing.

4. The method of claim 1, further comprising:
reading the source image data from a frame buffer memory for input to the pixel processing pipeline; and
processing the source image data using the pixel processing pipeline provided by function calls of a 3D graphics library to produce processed source image data.

5. The method of claim 1, further comprising:
storing the destination image data represented in the shared exponent format in the graphics memory;
reading a portion of the destination image data represented in the shared exponent format from the graphics memory; and
decoding the portion of the destination image data represented in the shared exponent format to produce an expanded portion of the destination image data.

6. The method of claim 1, wherein the 3D graphics API extension enables the shared exponent format to be specified or returned for OpenGL function calls.

7. The method of claim 1, further comprising storing the destination image data represented in the shared exponent format in a frame buffer memory.

8. The method of claim 1, wherein the encoding of the source image data into the shared exponent format comprises:
clamping each component value for a pixel or texel of the source image data to the shared exponent range defined by zero and a maximum value represented by a mantissa and shared exponent to produce clamped component values;
determining the largest magnitude clamped component value of the clamped component values; and
computing the shared exponent for the pixel or texel based on the largest magnitude clamped component value.

9. The method of claim 1, further comprising the step of performing, by the pixel processing pipeline, pixel transfer operations on component values of the source image data prior to the step of encoding.

10. A computing system for providing image data represented in shared exponent format for graphics processing, comprising:
a graphics memory configured to store destination image data represented in the shared exponent format having a shared exponent bias of 15, wherein a mantissa value of zero indicates an image component value of the destination image data is zero independent of a value of the shared exponent;
a software driver configured to:
receive, from a three-dimensional (3D) graphics applications programming interface (API) extension, source image data specified by an application program, wherein the source image data is not represented in the shared image format;
receive, from the 3D graphics API extension, a format parameter that specifies the shared exponent format for destination image data;
convert the source image data to the shared exponent format to produce the destination image data using a pixel processing pipeline instead of the application program when the source image data is not represented in the shared exponent format specified by the format parameter;
transmit the destination image data represented in the shared exponent format to the graphics memory for storage; and
a graphics processor configured to read the destination image data from the graphics memory or write the source image data during the graphics processing.

11. The computing system of claim 10, further comprising a texture memory portion of the graphics memory that is coupled to the graphics processor and configured to store the destination image data represented in the shared exponent format.

12. The computing system of claim 11, wherein the graphics processor includes a texture fetch unit that is configured to decode the destination image data to produce expanded image data for use during shading operations.

13. The computing system of claim 11, wherein the software driver is further configured to read a portion of the destination image data from the texture memory and decode the portion of the destination image data to produce an expanded portion of the destination image data.

14. The computing system of claim 10, wherein the graphics processor is further configured to render graphics data to produce the source image data and store the source image data in the frame buffer.

15. The computing system of claim 10, wherein the 3D graphics API extension enables the shared exponent format to be specified or returned for OpenGL function calls.

16. The computing system of claim 10, wherein the encoding of the source image data into the shared exponent format comprises:
- clamping each component value for a pixel or texel of the source image data to the shared exponent range defined by zero and a maximum value represented by a mantissa and shared exponent to produce clamped component values;
- determining the largest magnitude clamped component value of the clamped component values; and
- computing the shared exponent for the pixel or texel based on the largest magnitude clamped component value.

17. The computing system of claim 16, wherein the maximum value represented by the mantissa and shared exponent is $(2^N-1)/2^N * 2^{(Emax-B)}$, where N is the number of mantissa bits per component for the shared exponent format, Emax is a maximum biased exponent value for the shared exponent format, and B is the shared exponent bias.

18. The computing system of claim 10, wherein the software driver is further configured to perform pixel transfer operations on component values of the source image data prior to converting the source image data to the shared exponent format.

19. A non-transitory computer readable medium storing instructions for causing a processor to provide uncompressed texture data for graphics processing by performing the steps of:
- receiving, from a three-dimensional (3D) graphics applications programming interface (API) extension, source image data specified by an application program, wherein the source image data is not represented in the shared exponent format;
- receiving, from the 3D graphics API extension, a format parameter that specifies the shared exponent format for destination image data, wherein the shared exponent format has a shared exponent bias of 15 and a mantissa value of zero indicates an image component value of the destination image data is zero independent of a value of the shared exponent;
- encoding, by a pixel processing pipeline instead of the application program, the source image data into the shared exponent format to produce the destination image data represented in the shared exponent format when the source image data is not represented in the shared exponent format specified by the format parameter; and
- transmitting the destination image data represented in the shared exponent format to a graphics memory for storage.

20. The non-transitory computer readable medium of claim 19, further comprising the step of performing, by the pixel processing pipeline, pixel transfer operations on component values of the source image data prior to the step of encoding.

* * * * *